United States Patent
Noriyama

[11] Patent Number: 5,825,439
[45] Date of Patent: Oct. 20, 1998

[54] ARRAY SUBSTRATE FOR DISPLAY

[75] Inventor: Hidetaka Noriyama, Tokyo, Japan

[73] Assignee: Kabushiki Kaisha Toshiba, Kawasaki, Japan

[21] Appl. No.: 580,098

[22] Filed: Dec. 22, 1995

[30] Foreign Application Priority Data

Dec. 22, 1994 [JP] Japan ..................................... 6-320429

[51] Int. Cl.⁶ ........................ G02F 1/1333; G02F 1/1345
[52] U.S. Cl. ............................................. 349/54; 349/152
[58] Field of Search ................................... 349/149, 143, 349/152, 54

[56] References Cited

U.S. PATENT DOCUMENTS

| | | | |
|---|---|---|---|
| 5,202,778 | 4/1993 | Niki | 349/54 |
| 5,442,469 | 8/1995 | Pitt | 359/58 |
| 5,471,329 | 11/1995 | Nakajima et al. | 349/54 |
| 5,497,146 | 3/1996 | Hebiguchi | 349/143 |
| 5,521,728 | 5/1996 | Kodate et al. | 349/152 |

FOREIGN PATENT DOCUMENTS

| | | | |
|---|---|---|---|
| 61-148428 | 7/1986 | Japan | 349/143 |
| 63-10558 | 1/1988 | Japan . | |
| 63-220289 | 9/1988 | Japan . | |
| 4-355729 | 12/1992 | Japan | 349/54 |
| 5-5901 | 1/1993 | Japan | 349/54 |
| 5-341312 | 12/1993 | Japan | 349/54 |
| 6-18910 | 1/1994 | Japan | 349/54 |

Primary Examiner—William L. Sikes
Assistant Examiner—Tiep H. Nguyen
Attorney, Agent, or Firm—Pillsbury Madison & Sutro

[57] ABSTRACT

An array substrate for a display equipped with a connecting conductor for electrically connecting signal lines and scan lines via non-linear element circuits, wherein the non-linear element circuit is configured with a scan line connecting pad or a signal line connecting pad as a first electrode and with the connecting conductor as a second electrode. By this way, a breakdown of the elements caused by the effect of static electrically generated on the way of production can be fully reduced and a width of a frame of the display unit can be fully reduced while maintaining a high production yield.

8 Claims, 6 Drawing Sheets

ARRAY SUBSTRATE FOR DISPLAY

BACKGROUND OF THE INVENTION

1. Field of the Invention

The present invention relates to an array substrate for a display in which a switching element is electrically connected to each pixel electrode.

2. Description of the Related Art

Flat display units typified by a liquid crystal display feature in that they are thin and light and consumes less power and utilizing such features, are used in various fields as a display unit of personal computers and word processors, as a TV display unit and as a projecting type display unit.

Among them, an active matrix type display unit in which a three-terminal non-linear element is electrically connected as a switching element to each pixel electrode can realize a good display image having no crosstalk between adjacent pixels and hence, its research and development has been actively implemented.

A light transmitting active matrix type liquid crystal display will be exemplified and its structure be explained briefly below.

An active matrix type liquid crystal display consists of a liquid crystal component held between an array substrate and an opposite substrate via an orientation film. The array substrate is composed of a glass substrate on which a plurality of signal lines and scan lines are disposed in a matrix. A pixel electrode is provided near each intersection thereof. The pixel electrode is made of ITO (Indium Tin Oxide) and equipped with a thin film transistor (hereinafter abbreviated as TFT) as a switching element. Storage capacitor lines are also disposed on the glass substrate approximately in parallel with the scan lines. An insulating film is interposed between the storage capacitor line and the pixel electrode so that an storage capacitor (Cs) is formed between the storage capacitor line and the pixel electrode.

An opposite substrate is constructed such that a matrix light shielding film for shielding the TFTs and periphery of pixel electrodes from light is disposed on the glass substrate and that opposite electrodes made from ITO are disposed thereon via an insulating film.

Each of the scan lines and signal lines on the array substrate is electrically connected to a driving circuit board via a FPC (Flexible Printed Circuit) on which metal wires are formed on a flexible board such as polyimide or via a TAB (Tape Automated Bonding) through which driving elements are disposed on a flexible wiring board.

The opposite electrode of the opposite substrate is electrically connected with the array substrate via transfer in which conductive particles such as silver particles are dispersed within resin, and is electrically connected to the driving circuit board via the FPC or TAB described above.

OBJECT OF THE INVENTION

In order to make it possible to check each wire and TFT of the array substrate for a display while preventing the elements of the pixel switches from being destroyed due to static electricity generated on the way of production of the array substrate of the active matrix type liquid crystal display described above, the following technique has been proposed. That is, as disclosed in U.S. Pat. No. 5,068,748, a connecting conductor is provided on the outside of a display pixel area and scan lines and signal lines are electrically connected respectively to the connecting conductor via non-linear element circuits composed of a diode or TFT.

In the array substrate equipped with such connecting conductor, the non-linear element circuit functions as a high resistant element for a voltage used in checking each wire and pixel switch, thus allowing each individual wire and pixel switch to be checked. However, the non-linear element circuit functions as a conductor for a high voltage caused by static electricity generated on the way of production of the array substrate. Due to that, it eliminates a potential between each scan line and each signal line and prevents the pixel switches and others from being destroyed electrostatically.

By the way, in order to improve the productivity, lower the cost and narrow the frame of the display unit, it has been demanded recently to obtain an array substrate having as large a display pixel area as possible from one glass substrate or to obtain as many array substrates as possible from one glass substrate.

However, although the production yield of the array substrates may be improved by disposing the non-linear element circuits and the connecting conductor as described above, the peripheral area is increased with respect to the display pixel area, going against the improvement of the productivity, the reduction of the cost and the reduction of the width of the frame of the display unit.

Accordingly, it is an object of the present invention to solve the aforementioned technological problem by providing an array substrate for a display which allows the width of the frame to be fully reduced while maintaining a high production yield.

SUMMARY OF THE INVENTION

According to one aspect of the present invention described in claim 1, an array substrate for a display comprises a display pixel area containing a plurality of signal lines and scan lines wired in a matrix on an insulating substrate, switching elements electrically connected with at least one of the signal lines and one of the scan lines, and pixel electrodes electrically connected to the switching elements; each of scan line connecting pads connected with each of the scan lines respectively and disposed on the outside of the display pixel area; each of signal line connecting pads connected with each of the signal lines respectively and disposed on the outside of the display pixel area; and a connecting conductor for electrically connecting the signal lines and the scan lines via non-linear element circuits; and is characterized in that each of the non-linear element circuits has a first electrode and a second electrode, the first electrode is one of the scan line connecting pads or one of the signal line connecting pads by itself and the second electrode is connected with the connecting conductor.

By constructing as described above, the peripheral area may be fully reduced with respect to the display pixel area, while maintaining a high production yield similarly to the prior art.

Further, according to the present invention, the width of the connecting conductor does not increase, so that it may be removed in a short time by polishing it or it may be fully removed electrically by an energy beam such as a laser beam regardless of a spot diameter thereof.

According to another aspect of the present invention described in claim 2, the first electrode in claim 1 is a comblike electrode having a plurality of narrow projections, and the second electrode is a comblike electrode having a plurality of narrow projections which extend from the connecting conductor and engage with the first electrode.

According to another aspect of the present invention described in claim 3, the narrow projections at the both ends of the row of the plurality of narrow projections of the second electrode fit into the gaps between the narrow projections at the both ends of the row of the plurality of narrow projections of the first electrode, and the narrow projections at the both ends of the row of the narrow projections of the first electrode are shorter than the other narrow projections.

According to an other aspect of the present invention described in claim 4, each of the non-linear element circuits is formed in a lamination with one of the scan line connecting pads or one of the signal line connecting pads at the place other than where the connecting conductor is located.

According to another aspect of the present invention described in claim 5, the non-linear element circuit conducts electricity only when a high voltage caused by static electricity is applied between the first electrode and the second electrode.

According to another aspect of the present invention described in claim 6, the non-linear element circuit is electrically insulated when a voltage for checking the array substrate is applied between the first electrode and the second electrode.

According to another aspect of the present invention described in claim 7, the non-linear element circuit comprises a plurality of two-terminal operating thin film transistors whose gate and drain are short-circuited and which are connected in parallel and a plurality of two-terminal operating thin film transistors whose gate and source are short-circuited and which are connected in parallel.

According to another aspect of the present invention described in claim 8, the connecting conductor is formed in a stripe so as to surround the display pixel area.

According to another aspect of the present invention described in claim 9, wherein the connecting conductor is removed by an energy beam.

The above and other related objects and features of the present invention will be apparent from a reading of the following description of the disclosure found in the accompanying drawings and the novelty thereof pointed out in the appended claims.

DETAILED DESCRIPTION OF PREFERRED EMBODIMENT

An active matrix type liquid crystal display constructed by using an array substrate for a display of one embodiment of the present invention will be explained below in detail with reference to the drawings.

Figure 1:
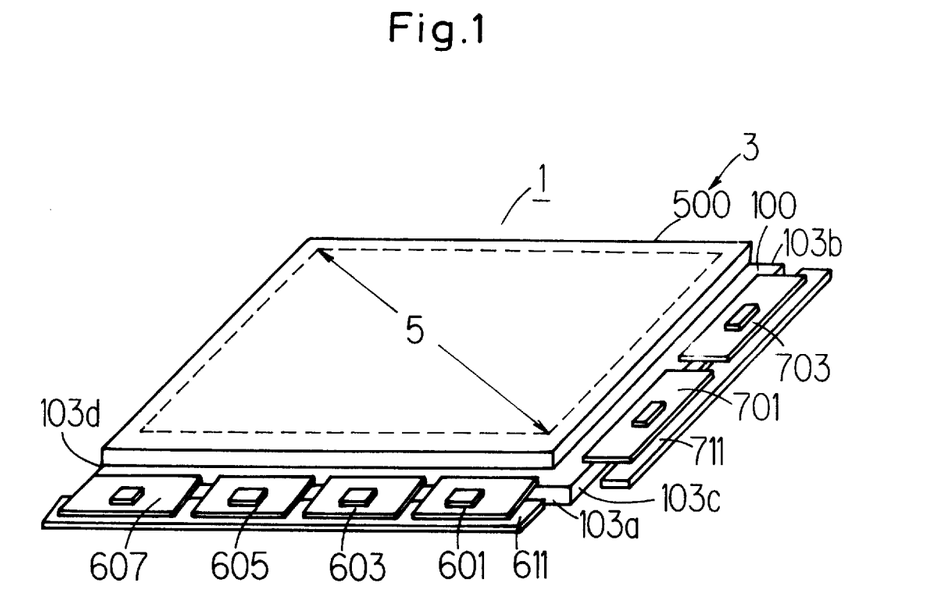
FIG. 1 is a schematic perspective view of an active matrix type liquid crystal display constructed by using an array substrate for a display according to one embodiment of the present invention.

As shown in FIG. 1, the active matrix type liquid crystal display 1 is a normally white mode light transmitting display equipped with a display pixel area 5 having 14 inches of diagonal size. A liquid crystal panel 3 consisted of a liquid crystal component held via an orientation film (not shown) is provided between the array substrate 100 and an opposite substrate 500. Four X-TABs 601, 603, 605 and 607 for supplying video signals Vs to the liquid crystal panel 3 are disposed along a first long side 103*a* of the array substrate 100. Two Y-TABs 701 and 703 for supplying scan signals Vg to the liquid crystal panel 3 are disposed along a first short side 103*c* of the array substrate 100. A X-side circuit board 611 is connected to the four X-TABs 601, 603, 605 and 607 and a Y-side circuit board 711 is connected to the two Y-TABs 701 and 703.

The array substrate 100 will be explained below with reference to FIG. 2. In the array substrate 100, a plurality of signal lines Xi and scan lines Yj are arrayed so that they cross approximately at right angles and a plurality of storage capacitor lines Cj are arrayed approximately in parallel with the scan lines Yj on a glass substrate 101.

TFTs 131 are disposed near the intersections of the signal line Xi and the scan Yj. The TFT 131 uses one scan line Yj as a gate electrode 111 and one signal line Xi as a drain electrode 121. The semiconductor layer of the TFT 131 has a inverse stagger structure using amorphous silicon (a-Si: H). A pixel electrode 141 is disposed via a source electrode 123 of the TFT 131. It should be noted that an auxiliary capacity Cs is created between the storage capacitor line Cj and the pixel electrode 141 described above. The display pixel area 5 is constructed by the pixel electrodes 141 arrayed thus two-dimensionally.

In the present embodiment, the signal line Xi is led out only to the side of the first long side 103*a* of the glass structure 101 and the lead portion is electrically connected to the signal line connecting pad XCPi in order to reduce the outside dimensions of the display unit 1 with respect to the display pixel area 5. Further, the scan line yj is led out only to the side of the first short side 103*c* of the glass substrate 101 and the lead portion is electrically connected to the scan line connecting pad YCPj. The storage capacitor line Cj is also led out only to the side of the first short side 103*c* and the lead portion is connected to the storage capacitor line connecting pad CCP.

Disposed at the most outer end of the array substrate 100 is a connecting conductor 211 which is provided so as to surround the all four peripheral sides of the array substrate 100. It is noted that the connecting conductor 211 may be provided so as to surround the array substrate 100 in a shape of letter L.

Each signal line connecting pad XCPi is connected to the connecting conductor 211 via a first non-linear element circuit XSWi, respectively, each scan line connecting pad YCPj is connected to the connecting conductor 211 via a second non-linear element circuit YSWj, respectively, and the storage capacitor line connecting pad CCP is also connected to the connecting conductor 211 via a third non-linear element circuit CSW.

The first non-linear element circuit XSWi, the second non-linear element circuit YSWj and the third non-linear element circuit CSW are each constructed by four non-linear elements connected in parallel. The non-linear element is constructed by combining a two-terminal operating TFT whose gate and drain are short-circuited and a two-terminal operating TFT whose gate and source are short-circuited. A resistance value of the first non-linear element circuit XSWi, second non-linear element circuit YSWi and third non-linear element circuit CSW is set at 500 Kohm in 20 V. Thereby, an electrical insulation is achieved among the signal lines Xi, among the scan lines Yj or between the signal line Xi and the scan line Yj when checking the array substrate 100, thus allowing the desirable check to be implemented. When a high voltage caused by static electricity or the like is applied between the signal line Xi and the scan line Yj on the other hand, the signal line Xi and the scan line Yj are electrically connected, thereby preventing the breakdown of the elements of the TFT 131 or the short-circuit between the signal line Xi and the scan line Yj.

It should be noted that the connecting conductor 211 is removed after completing the array substrate 100 by irradiating a laser beam or the like along the connecting conductor 211. For example, the connecting conductor 211 is removed after disposing the orientation film (not shown) and implementing a rubbing process, after completing the liquid crystal plane 3 or after injecting the liquid crystal component.

Although not shown, the opposite substrate 500 has a light shielding film disposed in a matrix so as to shield the TFTs 131, gaps between the signal lines Xi and the pixel electrodes 141 and gaps between the scan lines Yj and the pixel electrodes 141, respectively, from light. It also has color filter layers of red (R), green (G) and blue (B) and opposite electrodes disposed on the color filter layers.

The structure of the first non-linear element circuit XSWi will be explained in detail exemplifying the first non-linear element circuit XSW2 connected to the signal line X2 and with reference to FIGS. 2 through 4.

Figure 2:
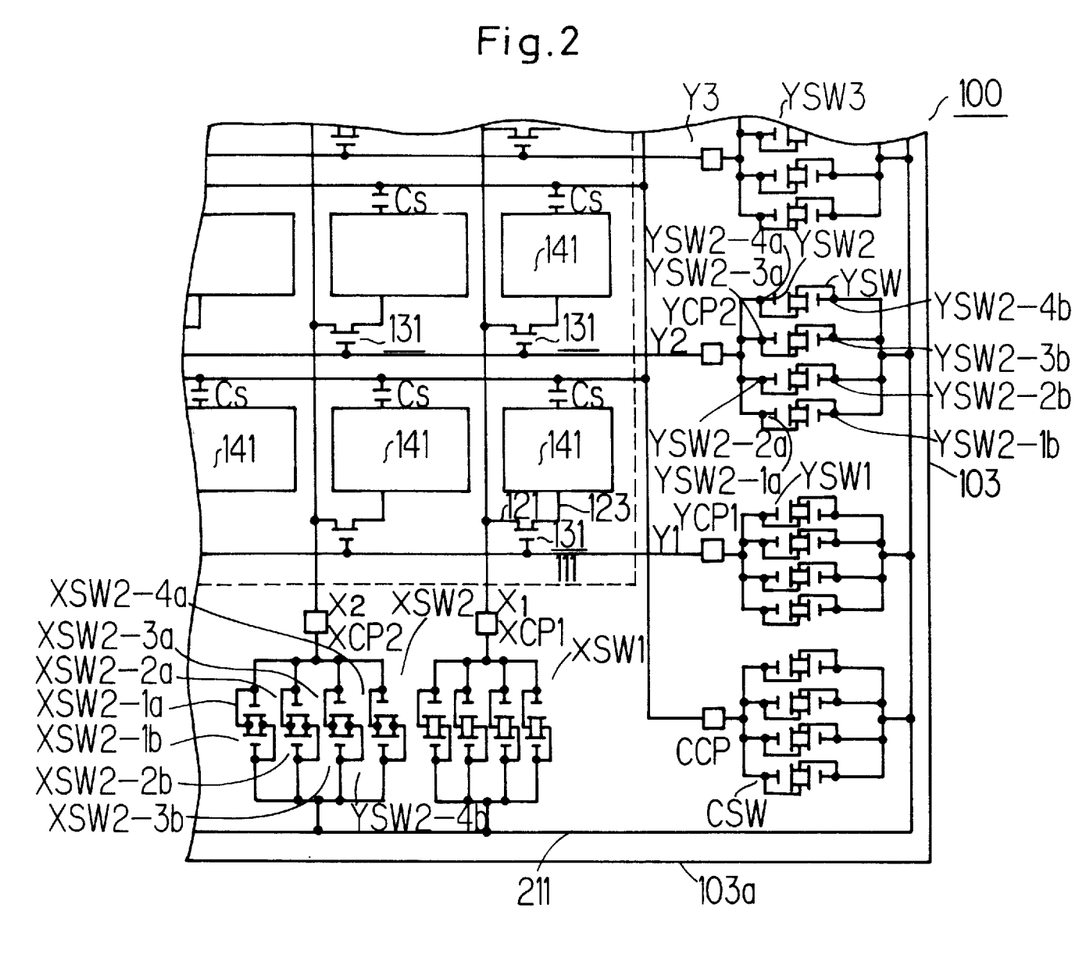
FIG. 2 is a schematic structural diagram of part of the array substrate in FIG. 1.

As shown in FIG. 2, the first non-linear element circuit XSW2 contains the four two-terminal operating TFTs XSW2-1a, XSW2-2a, XSW2-3a and XSW2-4a whose gate and drain are short-circuited and which are connected in parallel from each other and the four two-terminal operating TFTs XSW2-1b, XSW2-2b, XSW2-3b and XSW2-4b whose gate and source are short-circuited and which are connected in parallel from each other.

Figure 3:
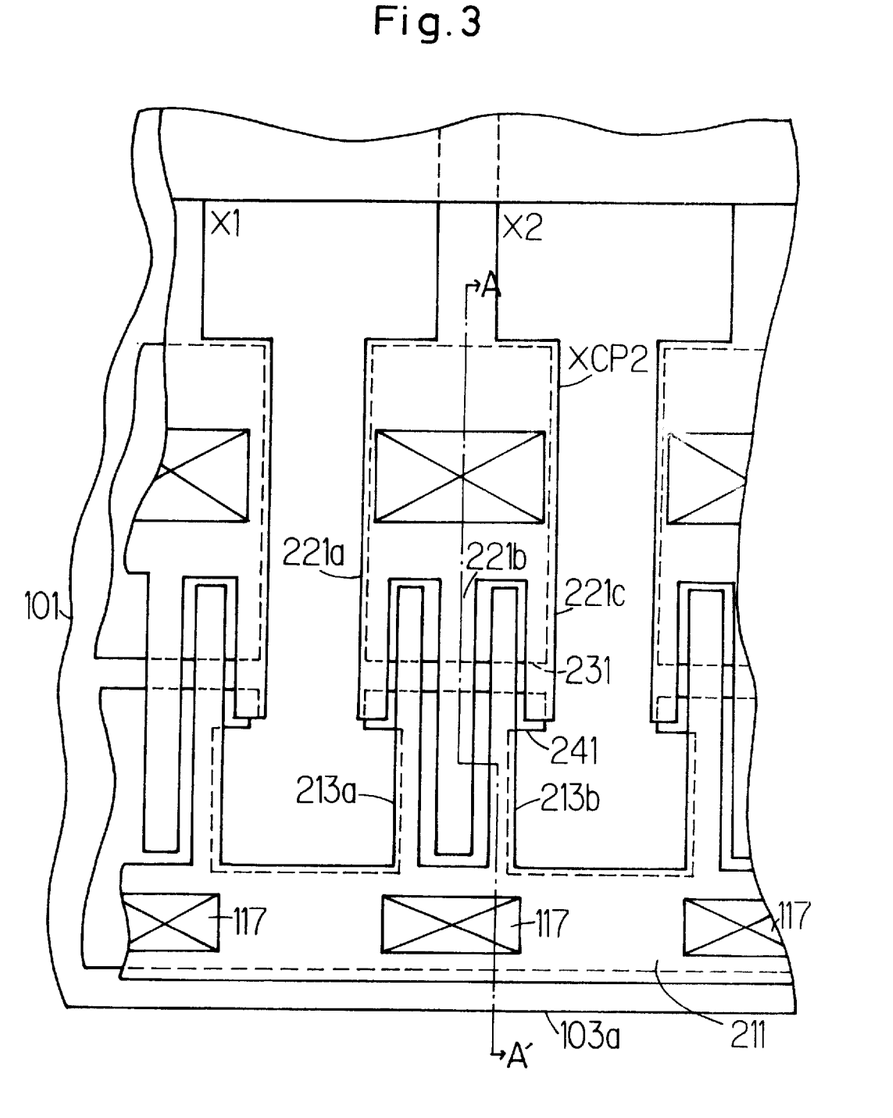
FIG. 3 is a schematic structural diagram near a first non-linear circuit element (XSW2) in FIG. 2.
Figure 4:
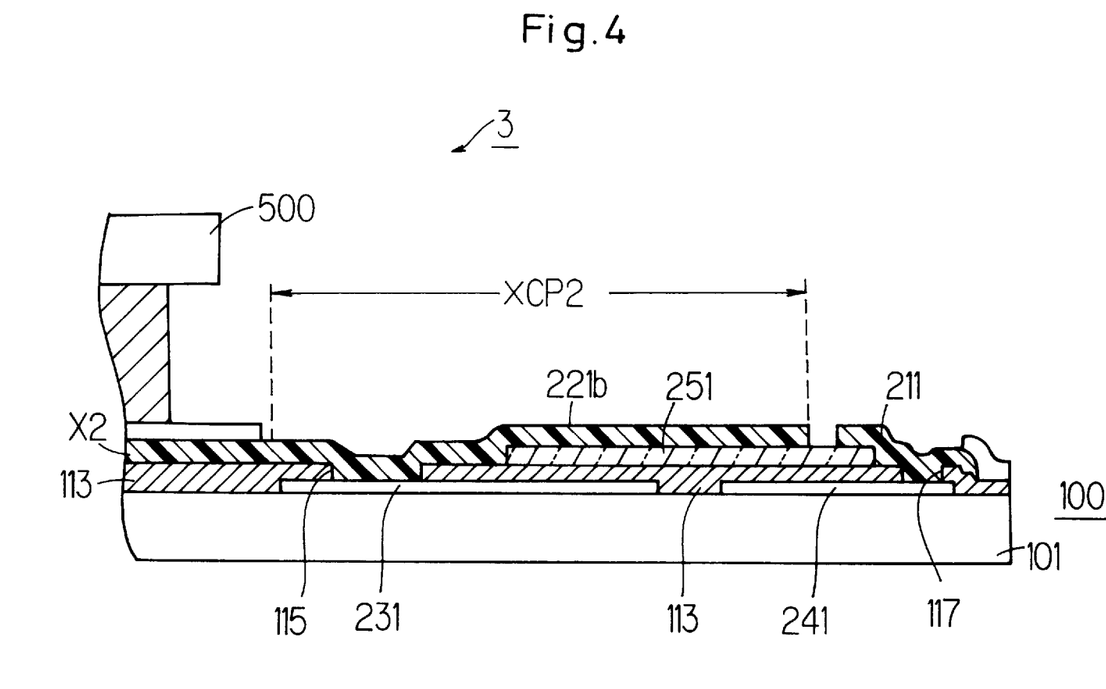
FIG. 4 is a schematic section view of the array substrate along a line A—A' in FIG. 3.

The two-terminal operating TFTs XSW2-1a through XSW2-4a and the two-terminal operating TFTs XSW2-1b through XSW2-4b are constructed as shown in FIGS. 3 and 4 and as described below for example.

The signal line X2 extended toward the first long side 103a of the glass substrate 101 is connected to the signal line connecting pad XCP2 configured in a body with the signal line X2 and having a considerably larger width than the wire width of the signal line X2. The signal line connecting pad XCP2 is made from aluminum (Al) for example.

Three comblike narrow projections 221a, 221b and 221c are projecting from the side of the first long side 103a of the signal line connecting pad XCP2. The narrow projections 221a and 221c at the both ends are shorter than the center narrow projection 221b. While the length of the narrow projections 221a and 221c is 110 micron, the length of the narrow projection 221b is 370 micron.

A first gate electrode layer 231 is disposed under the signal line connecting pad XCP2. The first gate electrode layer 231 is formed in the same time with the gate electrode 111 of the TFT 131. Between them, an insulating film 113 is formed in the same time with the gate insulating film of the TFT 131. Then, the first gate electrode layer 231 is electrically connected with the signal line connecting pad XCP2 via a contact hole 115 of the insulating film 113.

The connecting conductor 211 made of aluminum (Al) is formed in the same time with the signal line X2. The width of the connecting conductor 211 is 100 micron.

Two narrow projections 213a and 213b extend from the connecting conductor 211. The length of the narrow projections 213a and 213b are 370 micron. The two narrow projections 213a and 213b fit into the gaps between the narrow projections 221a, 221b and 221c extending from the signal line connecting pad XCP2. A second gate electrode layer 241 is disposed under the narrow projections 213a and 213b. The second gate electrode layer 241 electrically separated from the first gate electrode layer 221 is formed in the same time with the gate electrode 111 of the TFT 131 via the insulating film 113 formed in the same time with the gate insulating film of the TFT 131. The second gate electrode layer 241 is electrically connected to the connecting conductor 211 via a contact hole 117 created through the insulating film 113.

Then, an insular a-Si: H 251 as a semiconductor film similar to the semiconductor film composing the TFT 131 is disposed between the insulating film 113 and the narrow projections 221a, 221b and 221c, and between the insulating film 113 and the narrow projections 213a and 213b, respectively.

Thereby, on the first gate electrode layer 231, the two-terminal operating TFT XSW2-1a having the narrow projection 221a as the drain and the narrow projection 213a as the source and whose gate and drain are short-circuited is formed, the two-terminal operating TFT XSW2-2a having the narrow projection 221b as the drain and the narrow projection 213a as the source and whose gate and drain are short-circuited is formed, the two-terminal operating TFT XSW2-3a having the narrow projection 221b as the drain and the narrow projection 213b as the source and whose gate and drain are short-circuited is formed and the two-terminal operating TFT XSW2-4a having the narrow projection 221c as the drain and the narrow projection 213a as the source and whose gate and drain are short-circuited is formed.

Further, on the second gate electrode layer 241, the two-terminal operating TFT XSW2-1b having the narrow projection 221a as the drain and the narrow projection 213b as the source and whose gate and drain are short-circuited is formed, the two-terminal operating TFT XSW2-2b having the narrow projection 221b as the drain and the narrow projection 213a as the source and whose gate and drain are short-circuited is formed, the two-terminal operating TFT XSW2-3b having the narrow projection 221b as the drain and the narrow projection 213b as the source and whose gate and drain are short-circuited is formed and the two-terminal operating TFT XSW2-4b having the narrow projection 221c as the drain and the narrow projection 213b as the source and whose gate and drain are short-circuited is formed.

While the structure of the first non-linear element circuit XSWi has been explained above exemplifying the first non-linear element circuit XSW2 connected to the signal line x2, an explanation of the other first non-linear element circuits XSWi will be omitted here because they have the same structure.

The array substrate 100 of the present embodiment constructed as described above exerts the following effects.

As described above, one electrode of the first non-linear element circuit XSWi is configured by the narrow projections 221a, 221b and 221c extending from the signal line connecting pad XCPi and the other electrode which corresponds to one electrode is configured by the narrow projections 213a and 213b extending from the connecting conductor 211. Accordingly, even though the length of the signal line connecting pad XCPi is set fully long so as to be able to obtain a reliable conduction to and from the X-TAB 601, the peripheral area is not increased, thus achieving the reduction of the width of the frame of the liquid crystal display 1. Further, because the peripheral area is formed in fully small size with respect to the display pixel area 5, a large number of array substrates 100 may be obtained from one glass substrate, thus allowing the improvement of the productivity and the reduction of the cost of the unit.

It is noted that if only the reduction of the width of the frame of the liquid crystal display 1 is needed, it is conceivable to set a large wire width for the connecting conductor 211 and to form the first non-linear element circuit XSWi within the connecting conductor 211 for example. On contrary, according to the present embodiment, the wire width of the connecting conductor 211 is not increased, so that the connecting conductor 211 can be removed electrically from the signal line Xi by an energy beam, such as a laser beam, having a small spot diameter.

Further, according to the present embodiment, the number of the narrow projections 231a and 231b extending from the connecting conductor 211 is less than that of the narrow projections 221a, 221b and 221c extending from the signal line connecting pad XCPi. Further, among the narrow projections 221a, 221b and 221c extending from the signal line connecting pad XCP2, the narrow projections 221a and 221c at the both ends are shorter than the center narrow projection 221b. Accordingly, there are less wires near the connecting conductor 211 as compared to that near the signal line connecting pad XCP2. Due to that, it becomes possible to prevent the first non-linear element circuit XSWi from short-circuiting with the neighboring first non-linear element circuit XSWi–1 or first non-linear element circuit XSWi+1 when the connecting conductor 211 is scanned by the energy beam such as a laser beam.

While the three narrow projections 221a, 221b and 221c are formed from the signal line connecting pad XCPi and two narrow projections 213a and 213b are formed from the connecting conductor 211 according to the present embodiment, the number and length of the narrow projections are not confined only to those and may be selected depending on the resistance value of the first non-linear element circuit XSWi.

The structure of the second non-linear element circuit YSWi will be explained below in detail exemplifying the second non-linear element circuit YSW2 connected to the signal line Y2 and with reference to FIGS. 2, 5 and 6. It is noted that because the other second non-linear element circuits YSWi and the third non-linear element circuit CSW have the almost same structure, their explanation will be omitted here.

As shown in FIG. 2, the second non-linear element circuit YSW2 contains four two-terminal operating TFTs YSW2-1a, YSW2-2a, YSW2-3a and YSW2-4a whose gate and drain are short-circuited and which are connected in parallel from each other and four two-terminal operating TFTs YSW2-1b, YSW2-2b, YSW2-3b and YSW2-4b whose gate and source are short-circuit and which are connected in parallel from each other.

Figure 5:
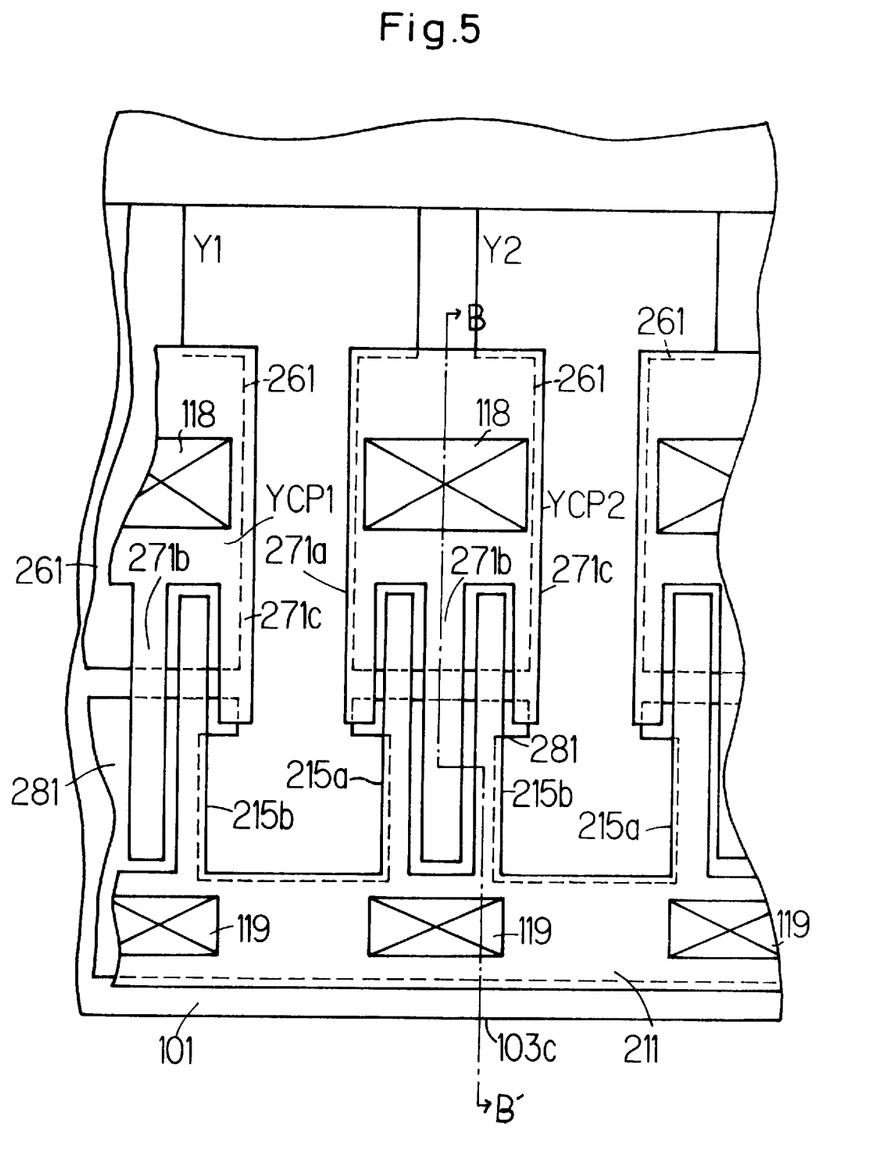
FIG. 5 is a schematic structural diagram near a second non-linear circuit element (YSW2) in FIG. 2.
Figure 6:
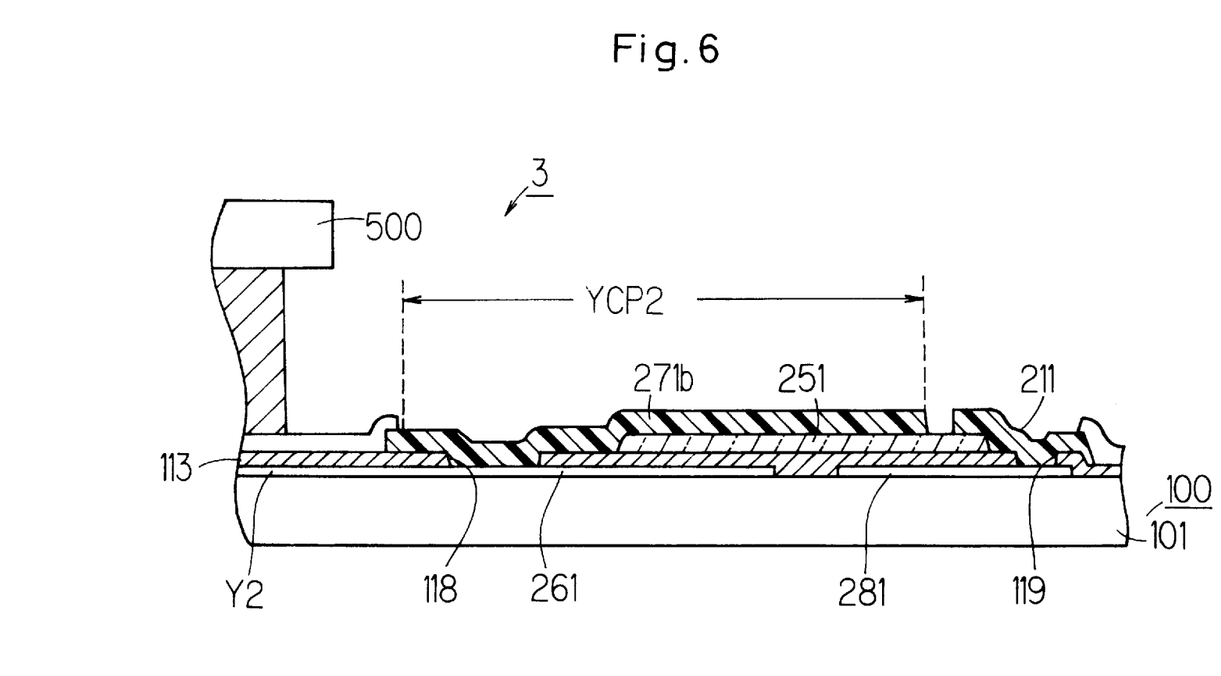
FIG. 6 is a schematic section view of the array substrate along a line B—B' in FIG. 5.

The two-terminal operating TFTs YSW2-1a through YSW2-4a and the two-terminal operating TFTs YSW2-1b through YSW2-4b are constructed as shown in FIGS. 5 and 6 and as described below for example.

The scan line Y2 extended toward the first short side 103c of the glass substrate 101 is connected to a first gate electrode layer 261 which is configured in a body with the scan line Y2 and having a considerably larger width than the wire width of the scan line Y2.

Disposed on the first gate electrode layer 261 is a scan line connecting pad YCP2 which is made of aluminum (Al). The scan line connecting pad YCP2 is formed in the same time with the signal line Xi, and therebetween the insulating film 113 is formed in the same time with the gate insulating film of the TFT 131. The scan line connecting pad YCP2 is electrically connected with the first gate electrode layer 261 via a contact hole 118 created through the insulating film 113.

Three comblike narrow projections 271a, 271b and 271c are projecting from the side of the first short side 103c of the scan line connecting pad YCP2. The narrow projections 271a and 271c at the both ends are shorter than the center narrow projection 271b. While the length of the narrow projections 271a and 271c is 110 micron, the length of the narrow projection 271b is 370 micron.

The connecting conductor 211 made of aluminum (Al) is formed in the same time with the signal line Xi. The width of the connecting conductor 211 is 100 micron.

Two narrow projections 215a and 215b which engage with the narrow projections 271a, 271b and 271c through gaps therebetween extend from the connecting conductor 211. The length of the narrow projections 215a and 215b is 370 micron. A second gate electrode layer 281 is disposed under the connecting conductor 211 and the narrow projections 215a and 215b. The second gate electrode layer 281 is formed in the same time with the gate electrode 111 of the TFT 131, and therebetween the insulating film 113 is formed in the same time with the gate insulating film of the TFT 131. The first gate electrode layer 261 and the second gate electrode layer 281 face each other. The second gate electrode layer 281 is electrically connected to the connecting conductor 211 via a contact hole 119 created through the insulating film 113.

Then, an insular a-Si: H 251 as a semiconductor film similar to the semiconductor film composing the TFT 131 is disposed between the insulating film 113 and the narrow projections 271a, 271b and 271c, and between the insulating film 113 and the narrow projections 215a and 215b, respectively.

Thereby, on the first gate electrode layer 261, the two-terminal operating TFT YSW2-1a having the narrow projection 271a as the drain and the narrow projection 215a as the source and whose gate and drain are short-circuited is formed, the two-terminal operating TFT YSW2-2a having the narrow projection 271b as the drain and the narrow projection 215a as the source and whose gate and drain are short-circuited is formed, the two-terminal operating TFT YSW2-3a having the narrow projection 271b as the drain and the narrow projection 215b as the source and whose gate and drain are short-circuited is formed and the two-terminal operating TFT YSW2-4a having the narrow projection 271c as the drain and the narrow projection 215b as the source and whose gate and drain are short-circuited is formed.

Further, on the second gate electrode layer 281, the two-terminal operating TFT YSW2-1b having the narrow projection 271a as the drain and the narrow projection 215a as the source and whose gate and drain are short-circuited is formed, the two-terminal operating TFT YSW2-2b having the narrow projection 271b as the drain and the narrow projection 215a as the source and whose gate and drain are short-circuited is formed, the two-terminal operating TFT YSW2-3b having the narrow projection 271b as the drain and the narrow projection 215b as the source and whose gate and drain are short-circuited is formed and the two-terminal operating TFT YSW2-4b having the narrow projection 271c as the drain and the narrow projection 215b as the source and whose gate and drain are short-circuited is formed.

The array substrate 100 of the present embodiment constructed as described above exerts the following effects.

As described above, one electrode of the second non-linear element circuit YSWj is configured by the narrow projections 271a, 271b and 271c extending from the scan line connecting pad YCPj and the other electrode which corresponds to one electrode is configured by the narrow projections 215a and 215b extending from the connecting conductor 211. Accordingly, even though the length of the scan line connecting pad YCPj is set fully long, the peripheral area is not increased. Further, because wire width of the connecting conductor 211 is not increased either, the connecting conductor 211 may be electrically removed even by an energy beam, such as a laser, having a small spot diameter.

Further, the number of the narrow projections 215a and 215b extending from the connecting conductor 211 is less than that of the narrow projections 271a, 271b and 271c extending from the scan line connecting pad YCPj. Further, among the narrow projections 271a, 271b and 271c extending from the scan line connecting pad YCPj, the narrow projections 271a and 271c at the both ends thereof are shorter than the center narrow projection 271b. Accordingly, there are less wires near the connecting conductor 211 as compared to those near the scan line connecting pad YCP2. Then, it becomes possible to prevent the second non-linear element circuit YSWj from short-circuiting with the neighboring second non-linear element circuit YSWj−1 or second non-linear element circuit YSWj+1 when the connecting conductor 211 is scanned by the energy beam such as a laser beam.

While three narrow projections 271a, 271b and 271c are formed from the scan line connecting pad YCPj and two narrow projections 215a and 215b are formed from the connecting conductor 211 in the present embodiment, the number of the narrow projections are not confined only to those and may be selected depending on the resistance value of the second non-linear element circuit YSWj.

Further, according to the present embodiment, the effect of static electricity generated on the way of production could be eliminated by the first non-linear element circuit XSWi, the second non-linear element circuit YSWj, the third non-linear element circuit CSW and the connecting conductor 211. Further, the breakdown of the elements of the TFT 131, the short-circuit between the signal line Xi and the scan line Yj and the short-circuit between the signal line Xi and the storage capacitor line Cj could be fully reduced, thereby allowing a high production yield.

The effect static electricity generated on the way of the production may be reduced further by providing a connecting conductor electrically connected respectively with the signal line Xi and the scan line Yj at the outer periphery of the connecting conductor 211 and by removing it before the checking process.

Although each non-linear element circuit has been constructed mainly by the two-terminal operating TFTs in which the a-Si:H is used as the semiconductor layer in the embodiments described above, it is not confined only to the a-Si:H. The two-terminal operating TFT may be constructed mainly by poly-crystal silicon (p-Si) if the TFT 131 of the display pixel area 5 is constructed by p-Si. The manufacturing process will not be increased if the two-terminal operating TFTs are thus constructed in accordance with the semiconductor layer of the TFT 131 of the display pixel area 5.

While preferred embodiments have been described, variations thereto will occur to those skilled in the art within the scope of the present inventive concepts which are delineated by the following claims.

What is claimed is:

1. An array substrate for a display, comprising:
   a display pixel area containing a plurality of signal lines and scan lines wired in a matrix on an insulating substrate, switching elements electrically connected with at least one of said signal lines and one of said scan lines, and pixel electrodes electrically connected to said switching elements;
   each of scan line connecting pads connected with each of said scan lines respectively and disposed outside of said display pixel area;
   each of signal line connecting pads connected with each of said signal lines respectively and disposed outside of said display pixel area; and
   a connecting conductor for electrically connecting said signal lines and said scan lines via non-linear element circuits;
   each of said non-linear element circuits having a first electrode and a second electrode;
   said first electrode being one of said scan line connecting pads or one of said signal line connecting pads by itself; and
   said second electrode being connected with said connecting conductor.

2. The array substrate for a display according to claim 1, wherein said first electrode is a comblike electrode having a plurality of narrow projections and said second electrode is a comblike electrode having a plurality of narrow projections which extend from said connecting conductor and which engage with said first electrode.

3. The array substrate for a display according to claim 2, wherein said narrow projections of said first electrode are arranged in a row and include two end projections and one other projection between the end projections, each of the end projections is spaced from said other projection by a respective one of two gaps, said plurality of narrow projections of said second electrode comprise two narrow projections each of which is fitted into a respective one of said two gaps, and said narrow end projections of said first electrode are shorter than the other narrow projection.

4. The array substrate for a display according to claim 1, wherein each of said non-linear element circuits includes a semiconductor region formed on one of said scan line connecting pads or one of said signal line connecting pads at a place other than where said connecting conductor is located.

5. The array substrate for a display according to claim 1, wherein said non-linear element circuit conducts electricity only when a high voltage caused by static electricity is applied between said first electrode and said second electrode.

6. The array substrate for a display according to claim 1, wherein said non-linear element circuit is electrically insulated when a voltage for checking said array substrate is applied between said first electrode and said second electrode.

7. The array substrate for a display according to claim 1, wherein said connecting conductor is formed in a stripe so as to surround said display pixel area.

8. The array substrate for a display according to claim 1, wherein said connecting conductor is configured to be easily removed by an energy beam.

* * * * *